United States Patent
Dabak et al.

(10) Patent No.: US 10,955,273 B2
(45) Date of Patent: Mar. 23, 2021

(54) EXTENDED RANGE ADC FLOW METER

(71) Applicant: TEXAS INSTRUMENTS INCORPORATED, Dallas, TX (US)

(72) Inventors: Anand Dabak, Plano, TX (US); Venkata Ramanan, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 667 days.

(21) Appl. No.: 14/156,388

(22) Filed: Jan. 15, 2014

(65) Prior Publication Data
US 2014/0303910 A1    Oct. 9, 2014

Related U.S. Application Data

(60) Provisional application No. 61/808,464, filed on Apr. 4, 2013.

(51) Int. Cl.
*G01F 1/66*    (2006.01)
*G04F 10/00*   (2006.01)

(52) U.S. Cl.
CPC ............ *G01F 1/66* (2013.01); *G01F 1/667* (2013.01); *G04F 10/00* (2013.01)

(58) Field of Classification Search
CPC ............ G01F 1/667; G01P 5/245; G01P 5/18
See application file for complete search history.

(56) References Cited

U.S. PATENT DOCUMENTS

| | | | | |
|---|---|---|---|---|
| 4,787,252 | A | * | 11/1988 | Jacobson ............... G01F 1/66 73/861.28 |
| 6,065,350 | A | * | 5/2000 | Hill ....................... G01D 5/48 73/861.27 |
| 8,295,025 | B2 | * | 10/2012 | Edel ...................... A61C 17/20 361/157 |
| 2002/0143479 | A1 | * | 10/2002 | Fukuhara ............... G01F 1/667 702/45 |
| 2005/0288873 | A1 | * | 12/2005 | Urdaneta ............... G01F 1/66 137/487.5 |
| 2006/0277998 | A1 | * | 12/2006 | Masotti ................. G01S 7/52036 73/579 |
| 2008/0208056 | A1 | * | 8/2008 | Kuhn ..................... G01F 1/712 600/449 |
| 2014/0096586 | A1 | * | 4/2014 | Shen ...................... G01F 25/00 73/1.24 |

FOREIGN PATENT DOCUMENTS

| CH | 101922954 A | * | 12/2010 | |
|---|---|---|---|---|
| WO | WO-2005013015 A1 | * | 2/2005 | ............. G01F 1/667 |

* cited by examiner

*Primary Examiner* — Matthew G Marini
(74) *Attorney, Agent, or Firm* — Ray A. King; Charles A. Brill; Frank D. Cimino

(57) ABSTRACT

A method of calculating a time difference is disclosed. The method includes receiving a first ultrasonic signal ($r^{21}$) from a first transducer ($UT_1$) and receiving a second ultrasonic signal ($r^{12}$) from a second ultrasonic transducer ($UT_2$). The first and second ultrasonic signals are sampled to produce respective first and second sampled ultrasonic signals (502). Points having a value greater than a first threshold are selected from the first and second sampled ultrasonic signals (510). A difference in travel time between the first and second ultrasonic signals is calculated (512) in response to the selected points.

20 Claims, 15 Drawing Sheets

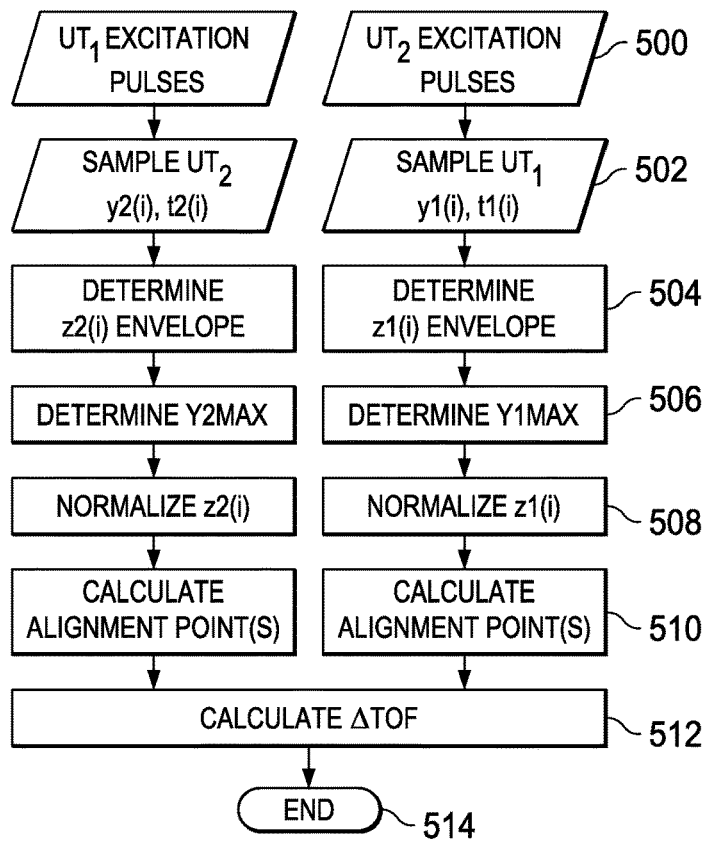
FIG. 5A
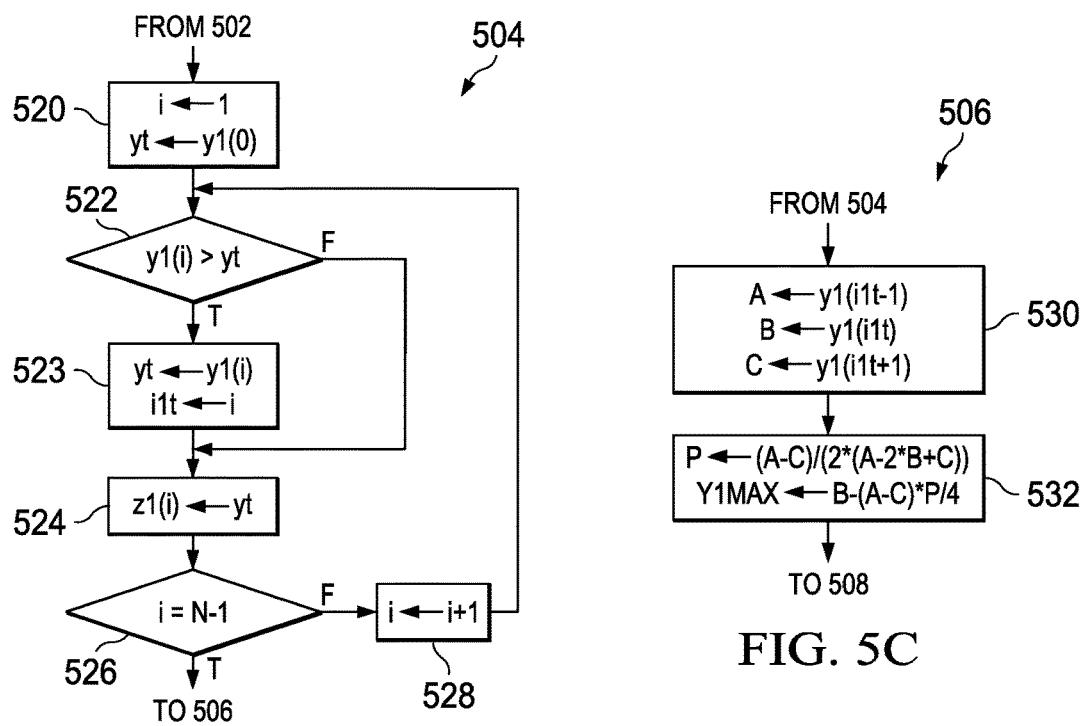
FIG. 5B
FIG. 5C

EXTENDED RANGE ADC FLOW METER

This application claims the benefit of U.S. Provisional Application No. 61/808,464 (TI-73669PS), filed Apr. 4, 2013, which is incorporated by reference herein in its entirety.

BACKGROUND OF THE INVENTION

Embodiments of the present invention relate to analog-to-digital (ADC) sampling of ultrasonic signals to determine fluid velocity.

Ultrasound technology has been developed for measuring fluid velocity in a pipe of known dimensions. Typically, these measurement solutions use only analog processing and limit the accuracy and flexibility of the solution. Ultrasound velocity meters may be attached externally to pipes, or ultrasound transducers may be places within the pipes. Fluid flow may be measured by multiplying fluid velocity by the interior area of the pipe. Cumulative fluid volume may be measured by integrating fluid flow over time.

FIG. 1 illustrates an example of positioning ultrasonic transducers for fluid velocity measurement. There are many alternative configurations, and FIG. 1 is just an example for the purpose of illustrating some basic equations for ultrasound measurement of fluid velocity. Two ultrasonic transducers $UT_1$ and $UT_2$ are mounted inside a pipe 100, and a fluid is flowing through the pipe with velocity V. L is the distance between the ultrasonic transducers $UT_1$ and $UT_2$ and θ is the angle between the dashed line connecting the transducers and the wall of the pipe. Propagation time $t_{12}$ or time of flight (TOF) is the time for an ultrasonic signal to travel from $UT_1$ to $UT_2$ within the fluid. Likewise, propagation time $t_{21}$ is the TOF for an ultrasonic signal to travel from $UT_2$ to $UT_1$ within the fluid. If C is the velocity of the ultrasonic signal in the fluid and V is the velocity of the fluid in pipe 100, these propagation times are given by equations [1] and [2].

$$t_{12} = \frac{L}{C + V\cos(\theta)} \quad [1]$$

$$t_{21} = \frac{L}{C - V\cos(\theta)} \quad [2]$$

The angle θ and the distance L are known, and the objective is to measure the fluid velocity V. If the velocity C of the ultrasonic signal in the fluid is known, then only the difference between propagation times $t_{12}$ and $t_{21}$ is needed. However, the velocity C is a function of temperature, and a temperature sensor may or may not be included based on the target cost of the measurement system. In addition, a flow meter may be used for different fluids such as water, heating oil, and gas. Measuring two different propagation times ($t_{12}$ and $t_{21}$) cancels the variability of C. Combining equations [1] and [2] yields equation [3] for the fluid velocity V.

$$V = \frac{L}{2} * \frac{t_{21} - t_{12}}{t_{21} t_{12}} \quad [3]$$

Therefore, to determine fluid velocity without knowing the velocity of an ultrasonic signal in the fluid, measurement of two ultrasonic propagation times ($t_{12}$ and $t_{21}$) are needed. The present inventors have realized a need to improve measurement techniques in terms of cost and accuracy. Accordingly, the preferred embodiments described below are directed toward improving upon the prior art.

BRIEF SUMMARY OF THE INVENTION

In a preferred embodiment of the present invention, a method of calculating a time difference is disclosed. The method includes receiving a first ultrasonic signal from a first transducer and receiving a second ultrasonic signal from a second ultrasonic transducer. The first and second ultrasonic signals are sampled, and points having a value greater than a first threshold are selected from the signal samples. A difference in travel time of the first and second ultrasonic signals is calculated in response to the selected points.

BRIEF DESCRIPTION OF THE SEVERAL VIEWS OF THE DRAWING

FIG. 5A is a flow chart showing operation of signal processing circuit 208 of FIG. 2A;

FIG. 5B is a flow chart showing envelope determination 504 from sampled values of received ultrasonic signals of FIG. 5A;

FIG. 5C is a flow chart showing determination of a maximum positive signal level 506 from sampled values of received ultrasonic signals of FIG. 5A;

DETAILED DESCRIPTION OF THE INVENTION

The preferred embodiments of the present invention provide significant advantages of ultrasonic differential time of flight (ΔTOF) measurement techniques in a fluid or gas medium over methods of the prior art as will become evident from the following detailed description.

Figure 1:
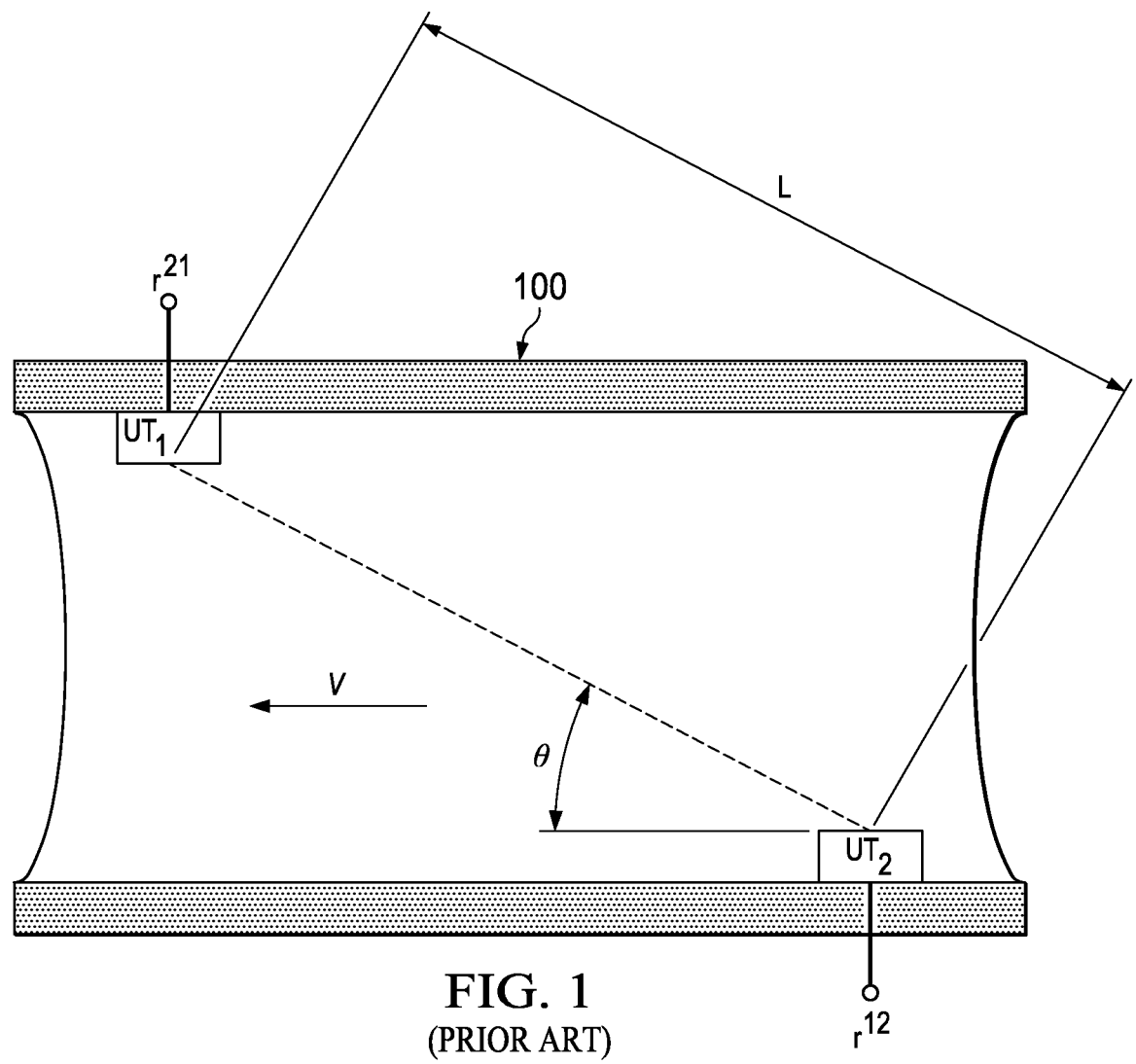
FIG. 1 is a diagram of a pipe with ultrasonic transducers for fluid flow measurement according to the prior art.
Figure 2A:
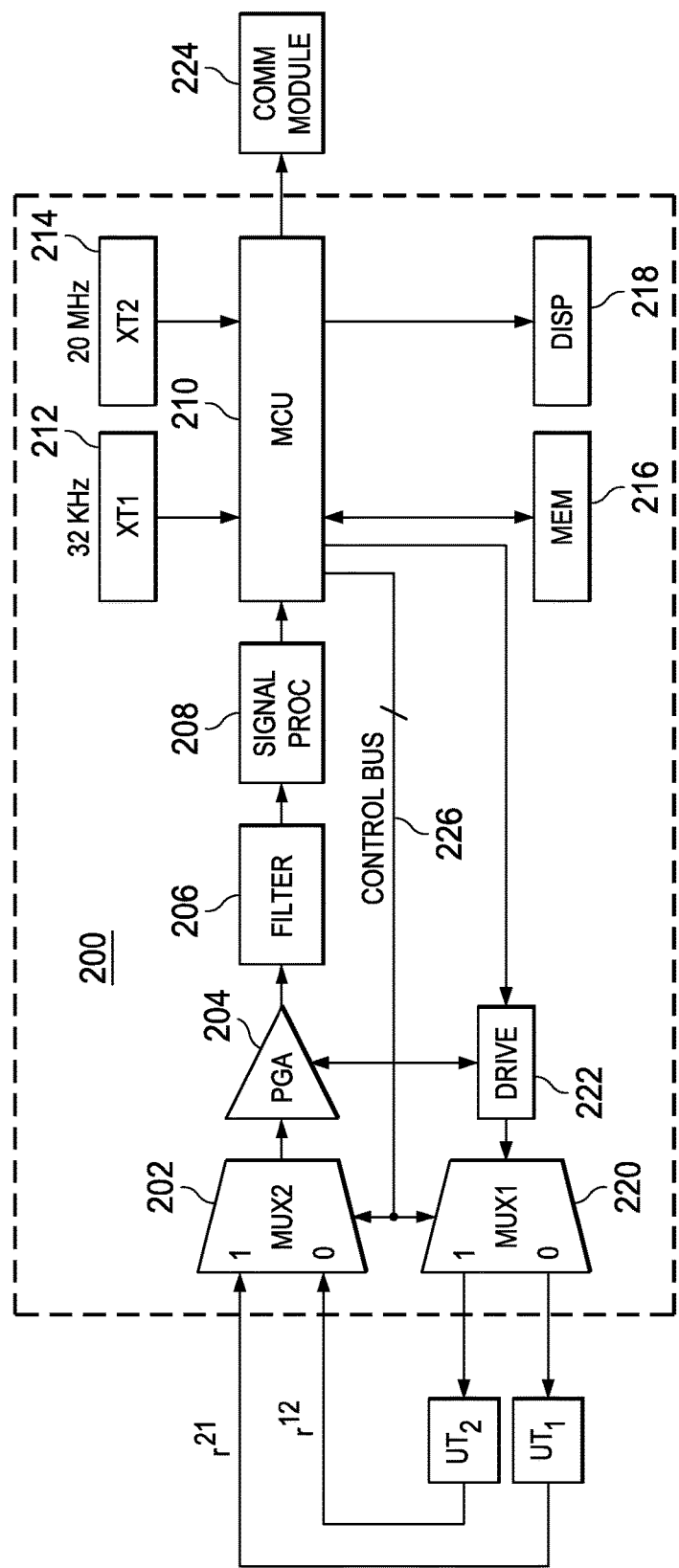
FIG. 2A is a circuit diagram of an ultrasonic measurement circuit of the present invention for measuring fluid flow.

Referring to FIG. 2A, there is a circuit diagram of an ultrasonic circuit of the present invention for measuring fluid flow. Referring back to FIG. 1, signal $r^{12}$ is the ultrasonic signal produced by transducer $UT_1$ and received from transducer $UT_2$ as given by equation 4. Likewise, signal $r^{21}$ is the ultrasonic signal produced by transducer $UT_2$ and received from $UT_1$ as given by equation 5. The center frequency of the transmitting transducer is $f_C$, and f(t) is the envelope of the received signal.

$$r^{12} = f(t)\sin(2\pi f_C t) \quad [4]$$

$$r^{21} = f(\pm \delta t)\sin(2\pi f_C(t + \delta t)) \quad [5]$$

The circuit 200 includes multiplex circuits 202 (MUX2) and 220 (MUX1) which are controlled by signals on control bus 226. MUX1 is coupled to receive an excitation signal from drive circuit 222 in response to micro control unit (MCU) 210. MCU 210 is coupled to memory circuit 216 and to display circuit 218. MCU 210 is also coupled to crystal oscillator circuit 212, which controls measurement times, and to crystal oscillator circuit 214, which controls excitation and sampling frequencies.

When a logical 0 from control bus 226 is applied to MUX1, the excitation signal from drive circuit 222 is applied to $UT_1$. $UT_1$ responsively transmits an ultrasonic signal to $UT_2$. $UT_2$ produces received signal $r^{21}$, which is applied to MUX2. The logical 0 applied to MUX1 is also applied to MUX2 so that $r^{21}$ is applied to programmable gain amplifier (PGA) 204. PGA 204 amplifies $r^{21}$ and applies it to filter 206. The filtered signal is then applied to signal processing unit 208 to calculate alignment points for $r^{21}$. Alternatively, when a logical 1 from control bus 226 is applied to MUX1, the excitation signal from drive circuit 222 is applied to $UT_2$. $UT_2$ responsively transmits an ultrasonic signal to $UT_1$. $UT_1$ produces received signal $r^{12}$, which is applied to MUX2. The logical 1 applied to MUX1 is also applied to MUX2 so that $r^{12}$ is applied to programmable gain amplifier (PGA) 204. PGA 204 amplifies $r^{12}$ and applies it to filter 206. The filtered signal is then applied to signal processing unit 208 to determine respective alignment points as will be described in detail. The MCU calculates the differential time of flight (ΔTOF) and fluid flow from the alignment points. The result is applied to communication module 224 and transmitted to a base station. The MCU also applies the result to display 218.

Figure 2B:
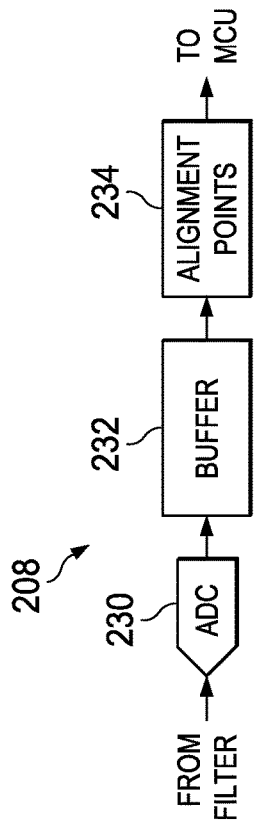
FIG. 2B is a circuit diagram showing detail of signal processing circuit 208 of FIG. 2A.

FIG. 2B is a circuit diagram showing detail of signal processing circuit 208 of FIG. 2A. The signal processing circuit alternately receives amplified and filtered ultrasonic signals from ultrasonic transducer $UT_1$ and $UT_2$. Analog-to-Digital Converter (ADC) 230 samples the received signals at a sampling frequency determined by MCU 210. The sampled signals are stored in buffer memory circuit 232. When sampled signals from both $UT_1$ and $UT_2$ are stored in buffer memory 232, circuit 234 calculates respective alignment points for each signal. Circuit 234 may be a digital signal processor, or any general purpose processor capable of real number calculations. Circuit 234 may also be a part of MCU 210 and may include both software and hardware. These alignment points are compared by MCU 210 to determine ΔTOF and fluid flow.

Figure 3A:
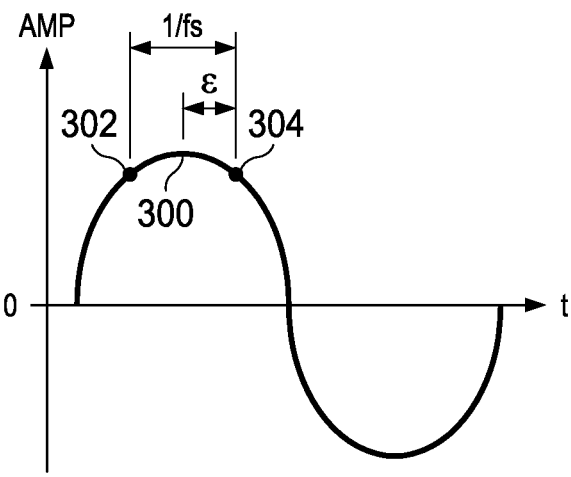
FIGS. 3A and 3B illustrate potential measurement errors due to sampling that are resolved by embodiments of the present invention.
Figure 3B:
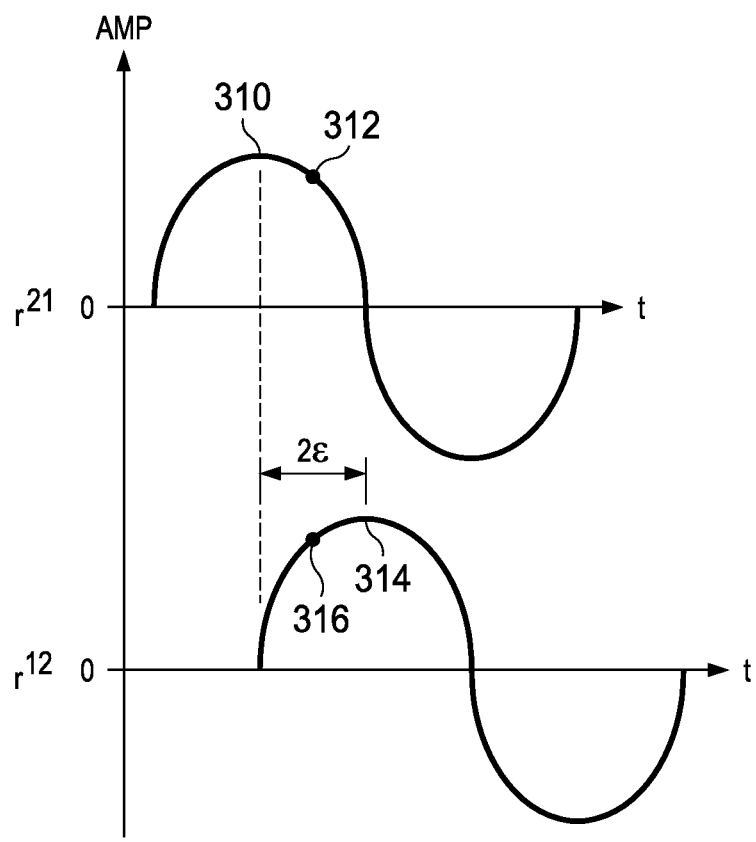

FIGS. 3A and 3B illustrate potential measurement errors due to sampling that are resolved by embodiments of the present invention. FIG. 3A illustrates a sine wave that may be applied to ADC 230 (FIG. 2B). Signal samples 302 and 304 are separated in time by the inverse of the sampling frequency fs. For example, if the sampling frequency is 1 MHz, samples 302 and 304 are separated in time by 1 µs. If the peak value 300 of the sine wave is taken as a true alignment point for signals from an ultrasonic transducer, the maximum error ε occurs when either of signal samples 302 or 304 are used for alignment points. If either of the samples 302 or 304 are used for alignment, the ΔTOF may have a worst case error of a or 0.5 ρs from either signal.

FIG. 3B illustrates sine waves $r^{21}$ and $r^{12}$ that may be applied to ADC 230 (FIG. 2B). Here, the true peak 310 of the positive half cycle of $r^{21}$ is separated in time from signal sample 312 by ε. Likewise, the true peak 314 of the positive half cycle of $r^{12}$ is separated in time from signal sample 316 by e. If signal samples 312 and 316 are aligned to calculate ΔTOF the resulting error may be as much as 2ε. This may be an acceptable error at higher sampling frequencies. However, embodiments of the present invention are directed to improved accuracy at lower sampling frequencies, thereby reducing system noise as well as cost.

Figure 3C:
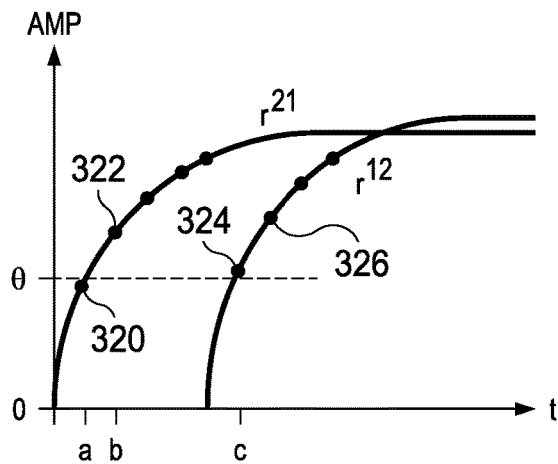
FIGS. 3C and 3D illustrate potential measurement errors due to mismatched ultrasonic transducers that are resolved by embodiments of the present invention.
Figure 3D:
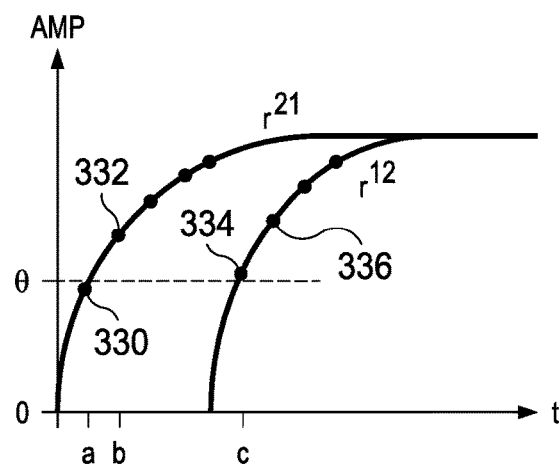

FIGS. 3C and 3D illustrate potential measurement errors due to mismatched ultrasonic transducers that are resolved by embodiments of the present invention. The transducers are fabricated separately from physical components and necessarily include some mismatch. FIG. 3C shows the envelopes of peak values of sampled signals $r^{21}$ and $r^{12}$, where the signal samples are represented by black dots 320-326. Each black dot represents a maximum sample value of one half cycle. Here, the envelope of $r^{12}$ has a greater peak amplitude than the envelope of $r^{21}$. Signal sample 324, corresponding to a first cycle of $r^{12}$, may be selected as an alignment point when it exceeds threshold θ. Signal sample 320, corresponding to a first cycle of $r^{21}$, may not be selected as an alignment point, however, since it does not exceed threshold θ due to the relatively lower amplitude. Thus, signal sample 322, corresponding to a second cycle of $r^{21}$, may be selected as an alignment point, since it does exceed threshold θ. If alignment points 322 and 324 are inadvertently selected for measurement, then the ΔTOF calculation will include a one-cycle error of 1 µs at fs=1 MHz.

FIG. 3D shows the envelopes of maximum sample values of signals $r^{21}$ and $r^{12}$, where the signal samples are represented by black dots 330-336. Here, the envelope of $r^{12}$ has the same amplitude as r but a faster rise time than the envelope of $r^{21}$. Signal sample 334, corresponding to a first cycle of $r^{12}$, may be selected as an alignment point when it exceeds threshold θ. Signal sample 330, corresponding to a first cycle of $r^{21}$, may not be selected as an alignment point, however, since it does not exceed threshold θ due to the relatively slower rise time. Thus, signal sample 332, corresponding to a second cycle of $r^{21}$, may be selected as an alignment point, since it does exceed threshold θ. If alignment points 332 and 334 are inadvertently selected for measurement, then the ΔTOF calculation will include a one-cycle error of 1 μs at fs=1 MHz.

Figure 4A:
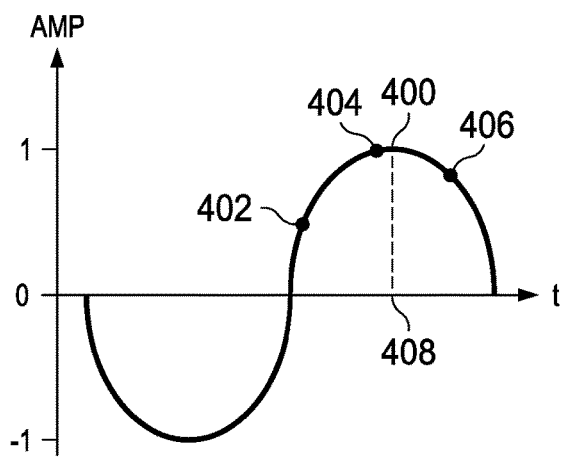
FIG. 4A is a diagram of a sine wave illustrating parabolic interpolation to determine a local peak value from sampled values.

Referring now to FIG. 4A, there is a diagram of a sine wave illustrating parabolic interpolation to determine a local maximum value from sampled values. The method is given at https://ccrma.stanford.edu/~jos/parshl/Peak_Detection_Steps_3.html. The three signal samples 402 through 406 are used to approximate the true peak 400 of the positive half cycle as well as the time 408 of the true peak as will be described in detail. Accuracy of the approximation depends on the ratio of the sampling frequency fs to the transducer center frequency fc. This approximation is reasonably accurate for a ratio of 4. However, accuracy is improved when the ratio is at least 6 (fs/fc=6), thereby providing at least 3 signal samples for each half cycle. Alignment points determined by parabolic interpolation, therefore, align signals $r^{12}$ and $r^{21}$ based on the time of the interpolated true peak of each half cycle and advantageously avoid the worst case 2ε error. Thus, accuracy of ΔTOF and fluid flow calculation are greatly improved.

Figure 4B:
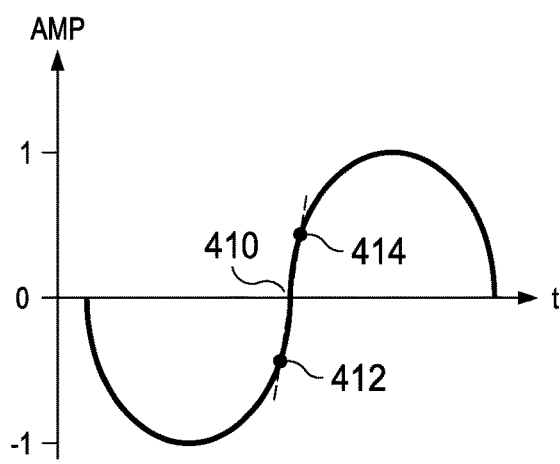
FIG. 4B is a diagram of a sine wave illustrating linear interpolation to determine a local zero crossing value from sampled values.

Referring now to FIG. 4B, there is a diagram of a sine wave illustrating linear interpolation to determine a zero crossing time 410 from signal samples 412 and 414. Accuracy of this method is comparable to parabolic interpolation and is also dependent on sampling frequency. In practice, signal samples 412 and 414 are selected to bracket the zero crossing of the sine wave. These sampled values define a line between the half cycles. The zero crossing times of ultrasonic signals $r^{12}$ and $r^{21}$ are then aligned to determine ΔTOF. Thus, accuracy of ΔTOF and fluid flow calculation are greatly improved.

Turning now to FIG. 5A, there is a flow chart showing operation of signal processing circuit 208 (FIG. 2A) and MCU 210 (FIG. 2B). The flow chart illustrates a left branch beginning with $UT_1$ excitation pulses and a right branch beginning with $UT_2$ excitation pulses 500. Both branches are the same except for different signal names, so only the right branch will be described in detail. In general, the right branch signal names include a "1" and the corresponding left branch signal names include a "2". The $UT_2$ excitation pulses are preferably 10 to 20 square wave pulses as illustrated on the left of FIG. 7A. The excitation pulses preferably have a center frequency fc near the resonant frequency of the ultrasonic transducer. The excitation pulses from $UT_2$ are received by $UT_1$ and an absolute value of the amplitude y1(i) at the time t1(i) are sampled 502 at a sample frequency fs by ADC 230 and stored in buffer memory 232 (FIG. 2B).

Envelope values of y1(i) signal samples are determined at block 504 as explained below with reference to FIG. 5B. Here, the envelope z1(i) includes increasing values of y1(i) and constant values of the current maximum y1(i) when y1(i) is decreasing. Index i is initialized to zero and temporary variable yt is initialized to y1(0) at block 520. Since sampling of the received ultrasonic signal 502 must begin prior to arrival of the signal, some initial samples may include system noise. Thus, initial samples of y1(i) having a magnitude less than a predetermined noise threshold θN (not shown) may be ignored. Decision block 522 tests whether y1(i) is greater than yt. If not (F), control passes to block 524 where z1(i) receives the current value of yt. Here, y1(i) stores the sample values and z1(i) stores the envelope values of y1(i) as will be explained in detail. Control then passes to decision block 526 to determine whether all N samples of y1(i) have been tested. If not (F), index i is incremented 528, and control passes again to decision block 522. As long as the test is false, yt holds the current maximum y1(i). When a y1(i) value is greater than yt, control passes to block 523 where yt receives a new and greater value of y1(i) and i1t receives the index i of this new current maximum value. Control then passes to block 524 where z1(i) receives the new yt. Control then passes to decision block 526 to determine if all N values of y1(i) have been tested. In this manner, each new maximum yt is stored in z1(i). Each new y1(i) that is not greater than yt is ignored, and the corresponding z1(i) is set to the current yt value. The process continues until all y1(i) have been tested. In one embodiment of the present invention, there are preferably 128 samples from $UT_1$ and another 128 samples from $UT_2$. Once all y1(i) samples are tested and all envelope values maxima are identified, decision block 526 is true and control passes to block 506.

Referring back to FIG. 5A, when all envelope values have been identified and the envelope of sample values is stored in z1(i), control passes to block 506 as shown at FIG. 5C. Index i1t is the index of the maximum y1(i) and z1(i) as determined at block 504. With i1t as the index of this maximum sample, control passes to blocks 530 and 532 where a parabolic approximation determines the true peak value Y1MAX. For example, if points 402 through 406 (FIG. 4A) are taken as A=0.4412, B=0.6919, and C=0.6646, respectively, then P=0.4012 and Y1MAX=0.7141 at point 400. If point 404 is sampled at 1.3 μs and the sample interval is 0.1 μs, then the peak 400 occurs at 1.3 μs+0.1 μs*0.4012 or 1.34 μs 408. Thus, point 404 is a local maximum value sampled at 1.3 μs, and point 400 is an approximation of the true maximum of the half cycle at 1.34 μs. It is highly advantageous to use the approximate time of the true maximum as an alignment point, since the time of sampled local maxima from $UT_1$ and $UT_2$ may differ as previously discussed with regard to FIGS. 3A and 3B.

Figure 5D:
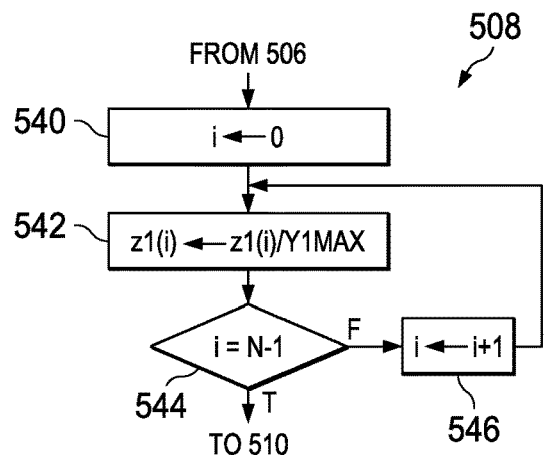
FIG. 5D is a flow chart showing normalization 508 of sampled values of received ultrasonic signals of FIG. 5A.
Figure 5E:
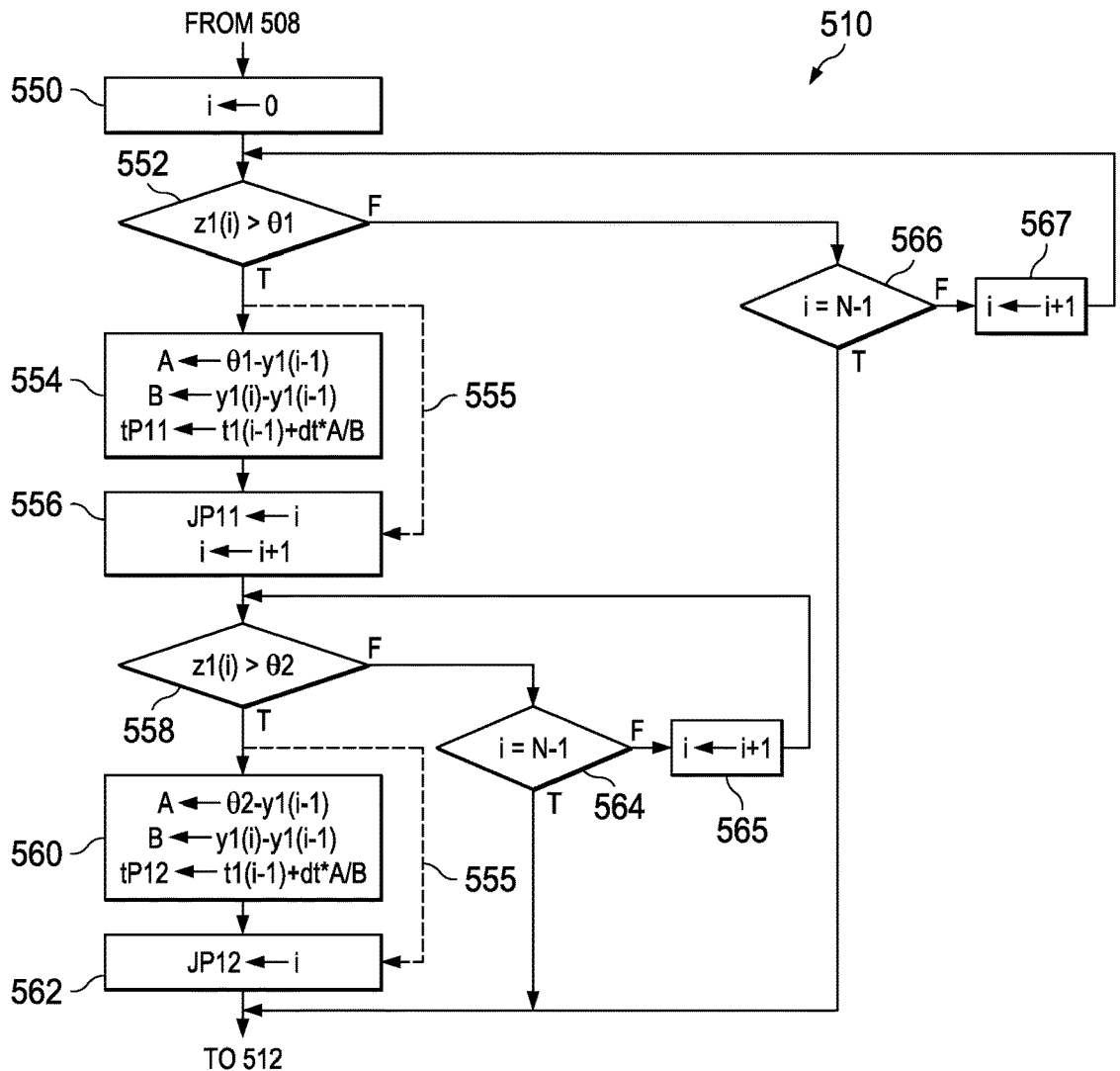
FIG. 5E is a flow chart of a first embodiment of the present invention using threshold values of received ultrasonic signals (Figure 5A) with optional parabolic interpolation to determine alignment points 510.

Referring again to Figure 5A, when Y1MAX is determined, z1(i) envelope values are normalized 508 as shown at FIG. 5D. Index i is initialized to zero at block 540. Control then passes to block 542 where z1(i) receives z1(i) divided by Y1MAX. Decision block 544 then determines if all z1(i) have been normalized. Here, N is the total number of envelope values. If there are more envelope values (F), i is incremented 546 and the next z1(i) sample is normalized. The process continues until all z1(i) values are normalized. The result is an envelope waveform stored in z1(i) as shown at FIG. 8B. This normalization advantageously avoids the problem of mismatched transducers having different amplitudes as previously discussed with reference to FIG. 3C.

Referring once again to Figure 5A, after normalization control passes to block 510 where alignment points are calculated by threshold determination with optional linear interpolation. By way of example, only two alignment points are calculated in the following discussion. However, the number of alignment points may be as few as one and as many as the number of sample values permit. Index i is initialized to zero at block 550. Control then passes to block 552 where normalized envelope value z1(i) is compared to a first threshold θ1. In one embodiment, θ1 is preferably 25% of the maximum envelope value. If z1(i) is less than θ1, control passes to decision block 566 to determine if all $z1(i)$ have been tested. If not, i is incremented 567 and control returns to decision block 552. This process continues until $z1(i)$ is greater than $\theta1$ (T). Control then passes to block 554 to interpolate a time value tP11 when the envelope $z1(i)$ crosses the $\theta1$ threshold. For example, if $\theta1$ is 0.25, $y1(i-1)$ is 0.23 at 8 µs, and $y1(i)$ is 0.31 at 9 µs, tP11 is 8.25 µs. Alternatively, if the sample interval dt (1/fs) is sufficiently small, control may pass directly to block 556 via path 555 and omit block 554. At block 556 the current value of i is stored in JP11. This is the index of the $z1(i)$ sample that first exceeds threshold $\theta1$. Index i is then incremented and control then passes to decision block 558.

Decision block 558 tests whether $z1(i)$ is greater than $\theta2$. In one embodiment, $\theta2$ is preferably 50% of the maximum envelope value. If not (F), decision block 564 determines if all $z1(i)$ have been tested. If not, i is incremented 565 and control passes again to decision block 558. This process continues until a current $z1(i)$ is greater than $\theta2$ (T). Control then passes to block 560 to interpolate a time value tP12 when the envelope $z1(i)$ crosses the $\theta2$ threshold. As previously discussed, if the sample interval dt is sufficiently small, control may pass directly to block 562 via path 555 and omit block 560. At block 562 the current value of i is stored in JP12. This is the index of the $z1(i)$ sample that first exceeds threshold $\theta2$.

Figure 5F:
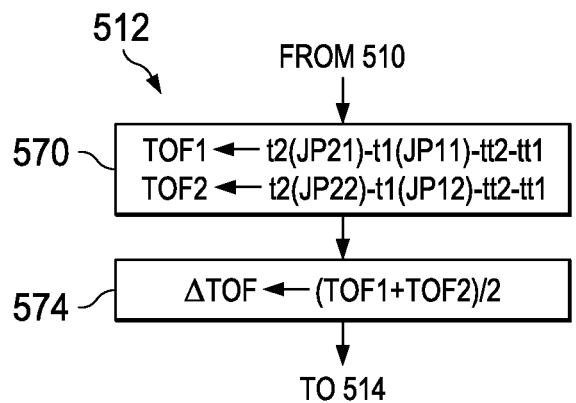
FIG. 5F is a flow chart showing calculation of differential time of flight 512 (FIG. 5A) from sampled received ultrasonic signals.
Figure 5G:
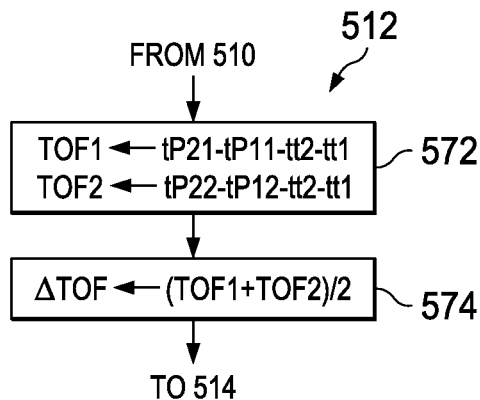
FIG. 5G is a flow chart showing calculation of differential time of flight 512 (FIG. 5A) from interpolated received ultrasonic signals.
Figure 5H:
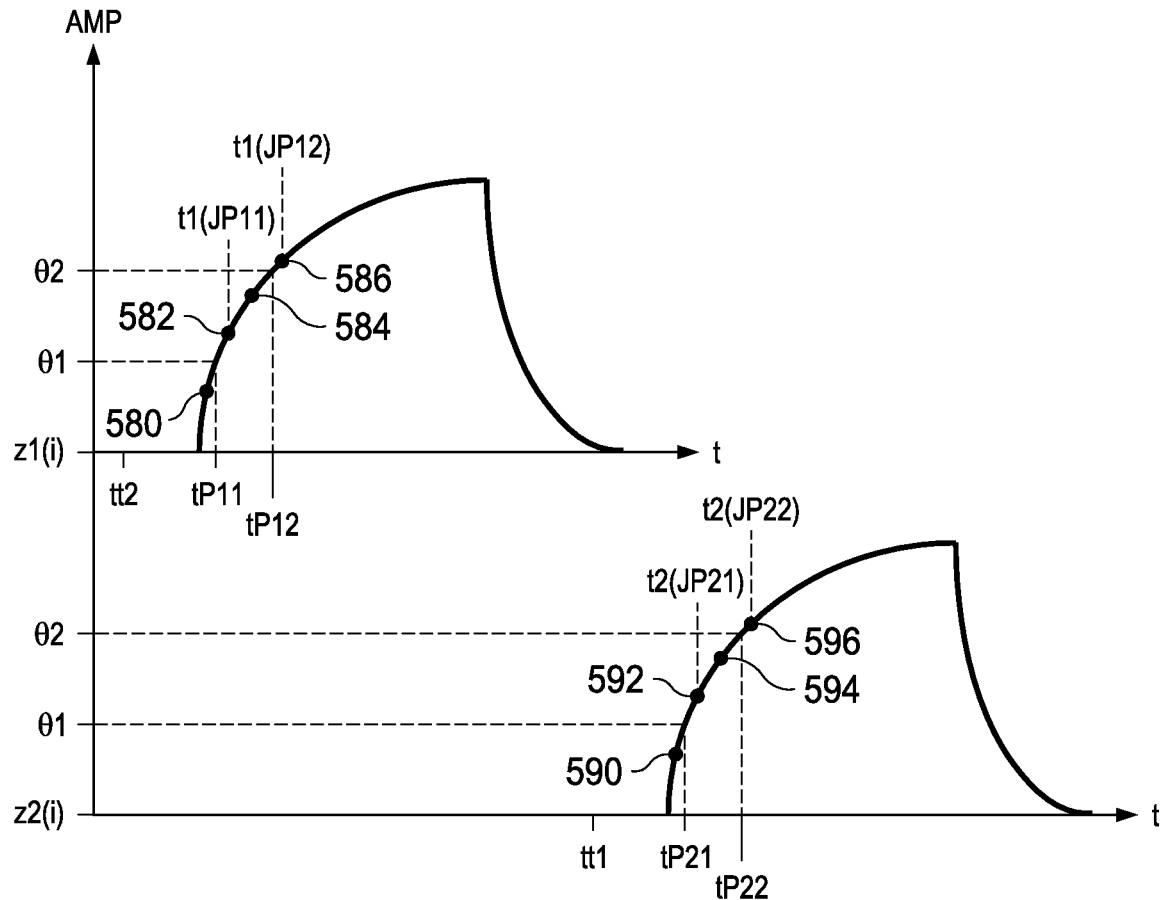
FIG. 5H is a diagram showing alignment points from right (upper) and left (lower) branch received signal envelopes of FIG. 5A.

Referring to FIG. 5H, the preceding values for the right branch of Figure SA are illustrated in the upper curve for envelope $z1(i)$. The corresponding values for the left branch of FIG. 5A are illustrated in the lower curve for envelope $z2(i)$. Referring first to the upper curve, transmit time tt2 is the time transducer $UT_2$ transmits an ultrasonic pulse to transducer $UT_1$. By way of example, sample 582 is the first normalized value of $z1(i)$ that is greater than threshold $\theta1$, and the preceding normalized value 580 is less than threshold $\theta1$. Block 554 interpolates time tP11 at threshold $\theta1$ as previously described. Alternatively, if sample interval dt is sufficiently small, time t1(JP11) of sample 582 may be used in lieu of tP1 to calculate differential time of flight. In a similar manner, sample 586 is the first normalized value of $z1(i)$ that is greater than threshold $\theta2$, and the preceding normalized value 584 is less than threshold $\theta2$. Block 560 interpolates time tP12 at threshold $\theta2$ as previously described. Alternatively, if sample interval dt is sufficiently small, time t1(JP12) of value 586 may be used in lieu of tP12 to calculate differential time of flight.

Referring to the lower curve of FIG. 5H corresponding to the left branch of FIG. 5A, transmit time tt1 is the time transducer $UT_1$ transmits an ultrasonic pulse to transducer $UT_2$. Sample 592 is the first normalized value of $z2(i)$ that is greater than threshold $\theta1$, and the preceding normalized value 590 is less than threshold $\theta1$. Block 554 interpolates time tP21 at threshold $\theta1$ as previously described. Alternatively, if sample interval dt is sufficiently small, time t2(JP21) of sample 592 may be used in lieu of tP21 to calculate differential time of flight. In a similar manner, sample 596 is the first normalized value of $z2(i)$ that is greater than threshold $\theta2$, and the preceding normalized value 594 is less than threshold $\theta2$. Block 560 interpolates time tP22 at threshold $\theta2$ as previously described. Alternatively, if sample interval dt is sufficiently small, time t2(JP22) of value 596 may be used in lieu of tP22 to calculate differential time of flight.

Referring back to FIG. 5A, block 512 uses the alignment points determined by block 510 using the sample indices JP1, JP12, JP21, and JP22 at Figure SF. Block 570 calculates differential time of flight values TOF1 and TOF2 corresponding to thresholds $\theta1$ and $\theta2$, respectively. TOF1 is taken as a time difference between alignment points t2(JP21) and t1(JP11) from respective left and right branches less their respective transmit times tt2 and tt1. TOF2 is taken as a difference between alignment points t2(JP22) and t2(JP12) from respective left and right branches less their respective transmit times tt2 and tt1. Control then passes to block 574 where TOF1 and TOF2 are averaged to produce the differential time of flight $\Delta TOF$. The calculation of $\Delta TOF$ ends 514 and MCU 210 calculates fluid flow and reports the result to communication module 224. MCU 210 preferably sends a running average of fluid flow and a cumulative use to display 218 (FIG. 2A).

The embodiment of block 512 at FIG. 5G uses the alignment points calculated by block 510 using the interpolated times tP11, tP12, tP21, and tP22 as previously discussed. Block 572 calculates differential time of flight values TOF and TOF2 corresponding to thresholds $\theta1$ and $\theta2$, respectively. TOF1 is taken as a time difference between alignment points tP21 and tP11 from respective left and right branches less their respective transmit times tt2 and tt1. TOF2 is taken as a difference between alignment points tP22 and tP12 from respective left and right branches less their respective transmit times tt2 and tt1. Control then passes to block 574 where TOF1 and TOF2 are averaged to produce the differential time of flight $\Delta TOF$. The calculation of $\Delta TOF$ ends 514 and MCU 210 calculates fluid flow and reports the result to communication module 224. MCU 210 preferably sends a running average of fluid flow and a cumulative use to display 218 (FIG. 2A).

Figure 6A:
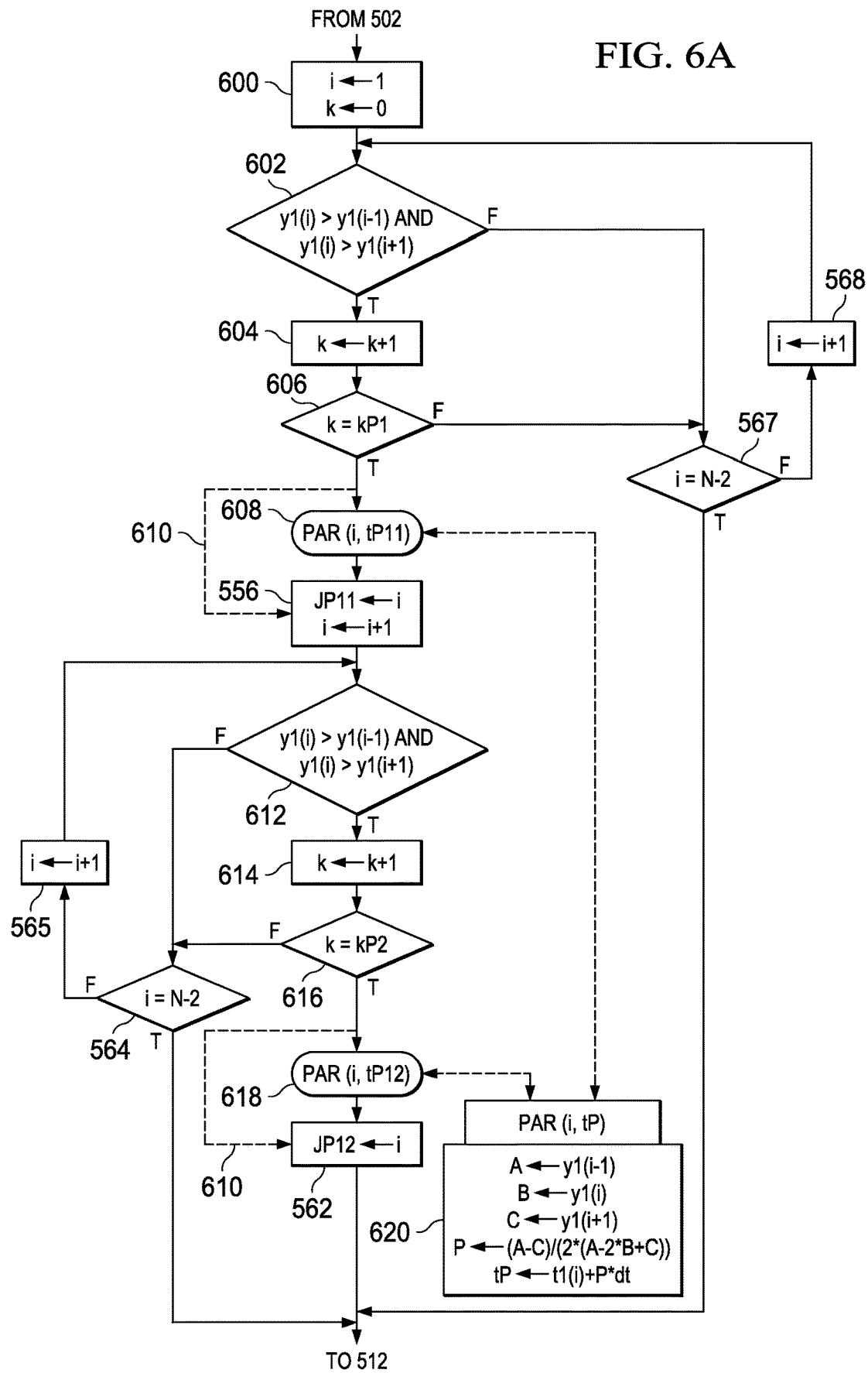
FIG. 6A is a flow chart of a second embodiment of the present invention using cycle numbers of received ultrasonic signals (FIG. 5A) with optional parabolic interpolation to determine alignment points.
Figure 6B:
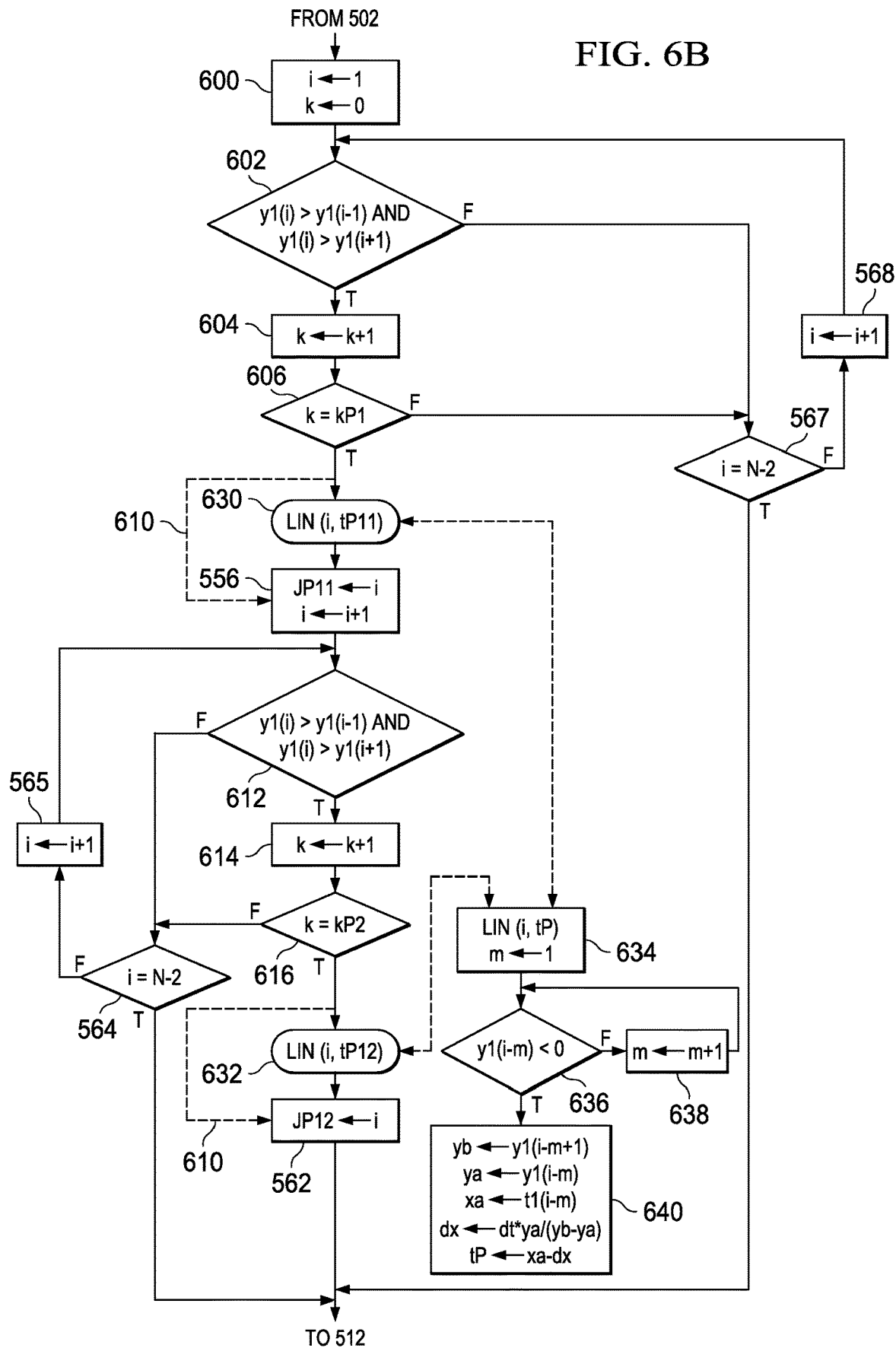
FIG. 6B is a flow chart of the second embodiment of the present invention using cycle numbers of received ultrasonic signals (FIG. 5A) with optional linear interpolation to determine alignment points.

Referring back to FIG. 5A, the embodiments of FIGS. 6A and 6B detect peaks of received signals and count cycles to determine alignment points, and operate directly on sample values $y1(i)$ from block 502. Thus, blocks 504 through 510 are omitted. This is highly advantageous in terms of simplicity and avoidance of problems discussed with regard to FIGS. 3C and 3D. Here, sample values $y1(i)$ at block 502 are not absolute values but retain their respective positive and negative values. In the embodiment of FIG. 6A, the parabolic approximation discussed with reference to FIG. 4A is optionally used to determine alignment points. In the embodiment of FIG. 6B, the linear approximation discussed with reference to FIG. 4B is optionally used to determine alignment points.

Turning first to FIG. 6A, the parabolic estimate to calculate alignment points will be discussed in detail. By way of example, only two alignment points are calculated in the following discussion. However, the number of alignment points may be as few as one and as many as the number of local maximum values. Index i is initialized to 1 and peak counter k is initialized to zero at block 600. Control then passes to block 602 to determine if the current $y1(i)$ is greater than $y1(i-1)$ and $y1(i+1)$. If not (F), the current $y1(i)$ is not a peak, and control passes to block 567 to determine if all samples have been tested. If so ( ), control passes to block 512 and the search ends. If not (F), index i is incremented 568, and control passes to block 602. When block 602 locates a peak sample of a half cycle (T), peak counter k is incremented 604, and control passes to block 606 to determine if the current peak count is equal to a first threshold peak kP1. For example, if ten excitation pulses are transmitted, the third cycle or peak (kP1=3) may correspond to a 25% threshold value of the envelope. If peak counter k is not equal to peak threshold kP1 (F), control passes to block 567 to determine if all samples have been tested. If not (F), i is incremented 568 and the process continues. When block 602 locates a peak that has a peak count k equal to kP1, control passes from block 606 to block 608 to call subroutine PAR. Subroutine PAR 620 estimates time tP of the true peak value near the current local peak y1(i) and returns the result in tP11. Here, t1(i) is the time of sample y1(i) from block 502, and dt is the time step between adjacent samples or 1/fs. Control then passes to block 556 where the current value of i is stored in JP11. This is the index of the sample number used to calculate the first alignment point tP11 as described with regard to FIG. 5G. Alternatively, if the sample time is sufficiently small, control may pass directly from block 606 to block 556 via path 610. In this case, sample time t1(JP11) is used as an alignment point as described with regard to Figure SF. Index i is then incremented and control then passes to decision block 612. Decision block 612 tests whether the current y1(i) is greater than y1(i−1) and y1(i+1). If not (F), the current y1(i) is not a peak, and control passes to block 564 to determine if all samples have been tested. If so (T), control passes to block 512 and the search ends. If not (F), index i is incremented 565, and control passes to block 612. When block 612 locates a peak sample of a half cycle (T), peak counter k is incremented 614, and control passes to block 616 to determine if the current peak count is equal to a second threshold peak kP2. For example, if ten excitation pulses are transmitted, the sixth cycle peak (kP2=6) may correspond to a 50% threshold value of the envelope. If peak counter k is not equal to peak threshold kP2 (F), control passes to block 564 to determine if all samples have been tested. If not (F), i is incremented 565 and the process continues. When block 612 locates a peak that has a peak count k equal to kP2, control passes from block 616 to block 618 to call subroutine PAR. Subroutine PAR 620 estimates time tP of the true peak value near the current local maximum y1(i) and returns the result in tP12. Control then passes to block 562 where the current value of i is stored in JP12. This is the index of the sample number used to calculate the second alignment point tP12 as described with regard to FIG. 5G. Alternatively, if the sample time is sufficiently small, control may pass directly from block 616 to block 562 via path 610. In this case, sample time t1(JP12) is used as an alignment point as described with regard to FIG. 5F. Control then passes to block 512 to calculate the differential time of flight from sample time alignment points (FIG. 5F) or by parabolic interpolated alignment points (FIG. 5G).

Turning now to FIG. 6B, an optional linear estimate to calculate zero crossing alignment points will be discussed in detail. By way of example, only two alignment points are calculated as previously discussed. The flow chart of FIG. 6B is the same as previously discussed with regard to FIG. 6A where identification numerals are the same. The main difference is that blocks 630 and 632 call subroutine LIN rather than subroutine PAR as in blocks 608 and 618. The first call 630 to subroutine LIN 634 initializes index m to one at block 634. Control then passes to decision block 636 to determine if y1(i-m) is less than zero. If not (F), m is incremented 638, and the next y1(i-m) is tested. The process continues until a negative value such as point 412 (FIG. 4B) is found. Control then passes to block 640 where point (xa, ya) is comparable to point 412 and point yb is comparable to point 414. These points are used to define a zero crossing at alignment point tP. This is comparable to point 410 and is returned as alignment point tP11. For example, if point 412 is taken as −0.1 at 1.3 ρs (ya, xa), point 414 is 0.2 (yb) at 1.4 ρs, then dt is 0.1 μs. Then dx is −3.33e-8 and tP is 1.33 μs at zero crossing point 410. The second call 632 to subroutine LIN 634 functions in the same manner but with a new index value i. A second alignment point is calculated and returned as tP12. As previously discussed with regard to FIG. 6A, JP11 and JP12 are the sample indices corresponding to alignment points tP11 and tP2, respectively. Likewise, when sample time interval is sufficiently small, sample times t1(JP11) and t1(JP12) may be used as alignment points without linear interpolation. Control then passes to block 512 where the differential time of flight ΔTOF is calculated by the method of FIG. 5F or 5G.

Figure 7A:
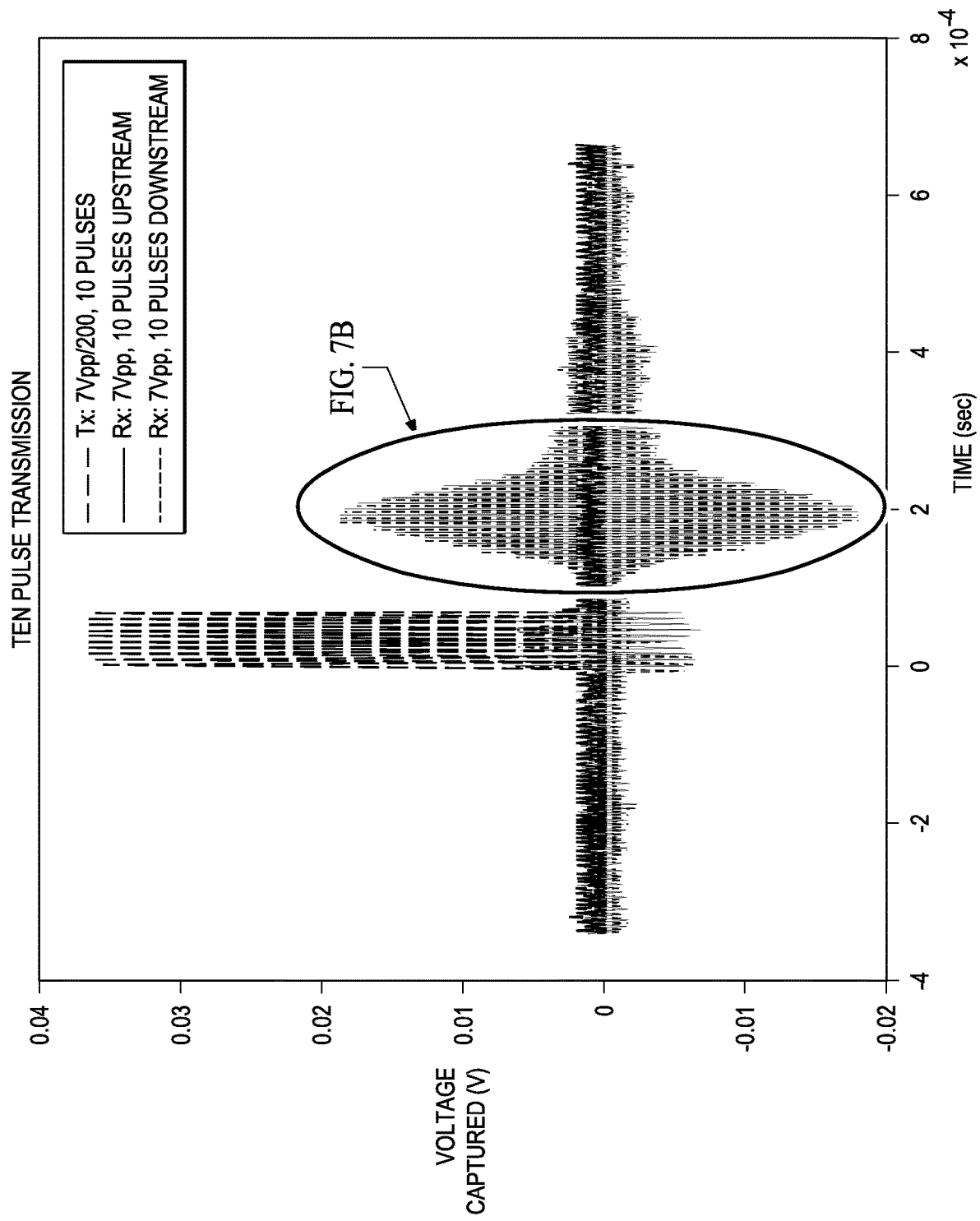
FIGS. 7A and 7B are diagrams of received upstream and downstream ultrasonic signals generated by 10 respective excitation pulses and adjusted for transmit time difference.
Figure 7B:
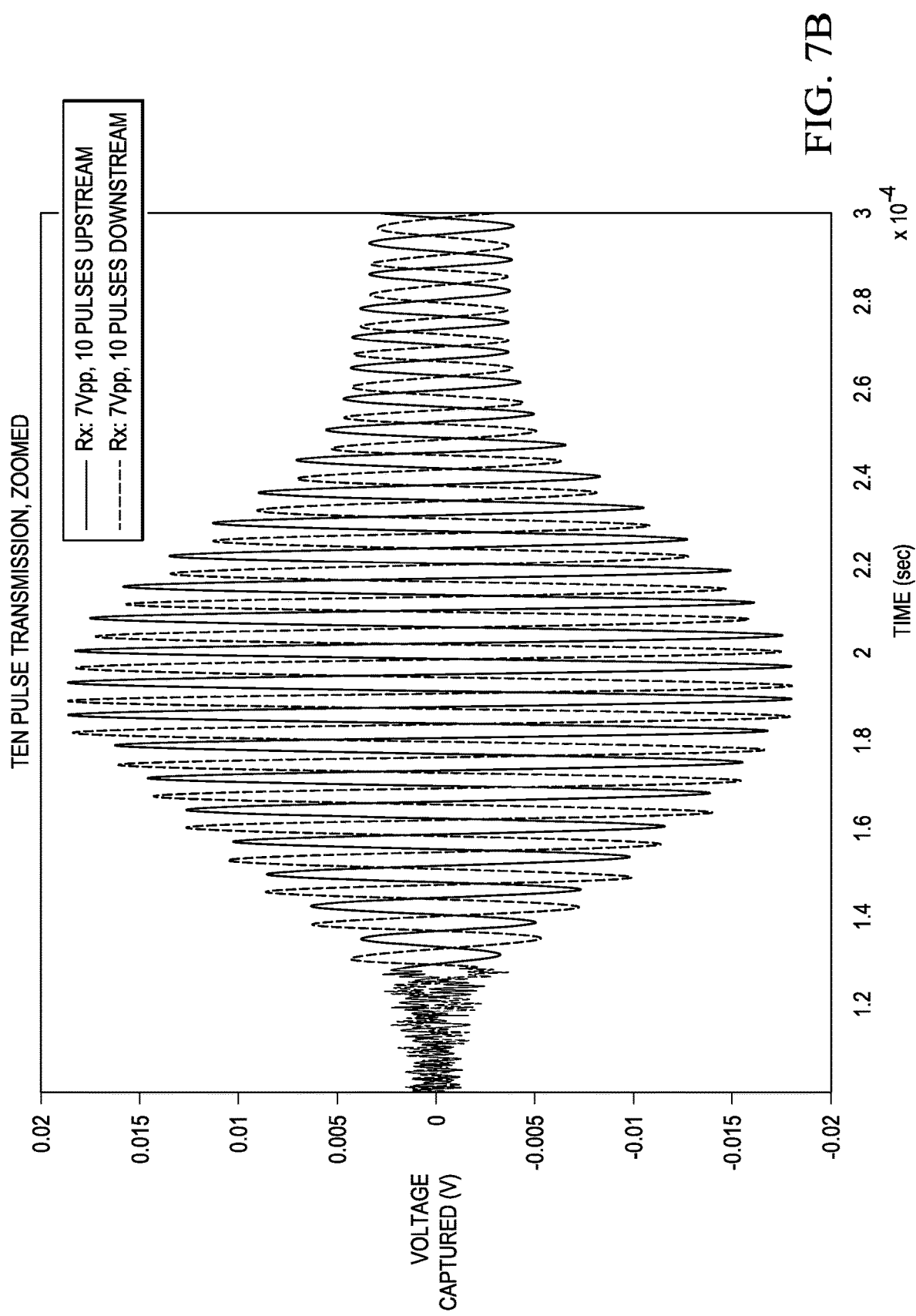

FIG. 7A is a diagram showing a 10-pulse excitation sequence on the left and resulting upstream and downstream received waveforms on the right. As previously explained with regard to FIG. 2A, frequency of the 10-pulse excitation sequence is precisely controlled by crystal XT2 214 and is the same as frequency of the received signals. Duration of the transmitted waveform is approximately equal to the envelope rise time of the received waveforms. The received waveforms are expanded in FIG. 7B. Respective transmit times are subtracted from the upstream and downstream waveforms so that the offset is due to the differential time of flight ΔTOF.

Figure 8A:
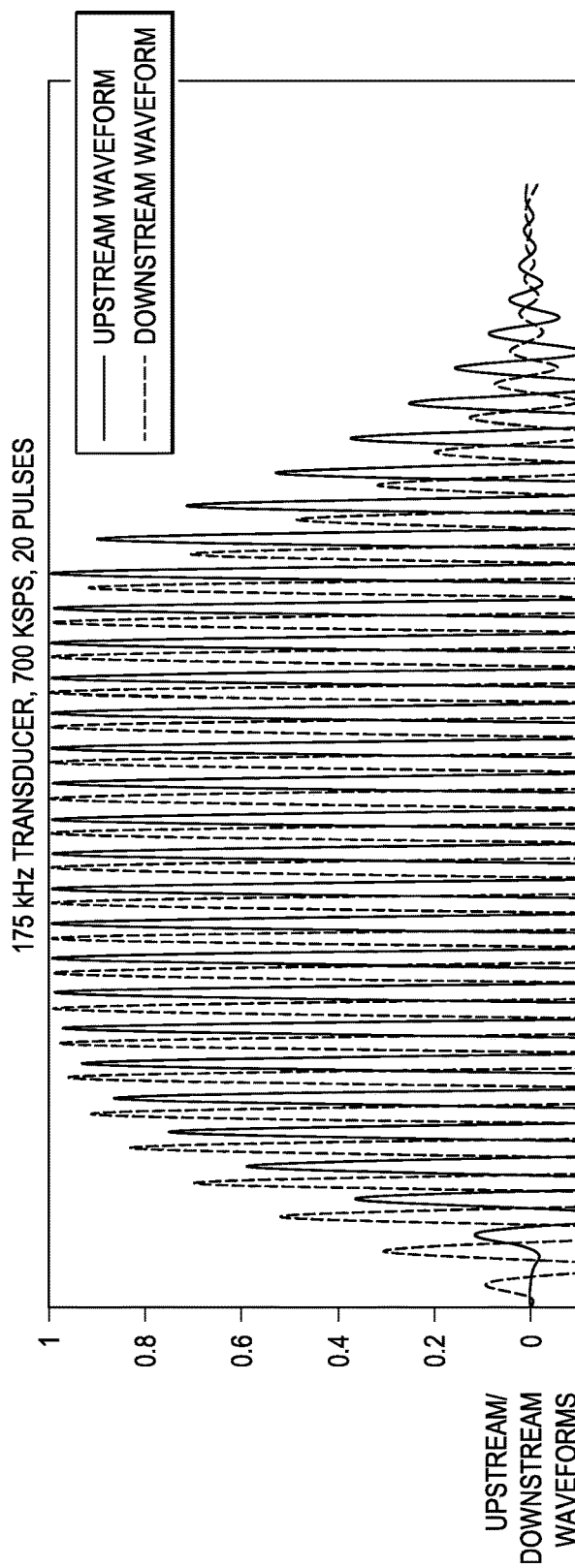
FIG. 8A is a diagram of received upstream and downstream ultrasonic signals generated by 20 respective excitation pulses and adjusted for transmit time difference.
Figure 8B:
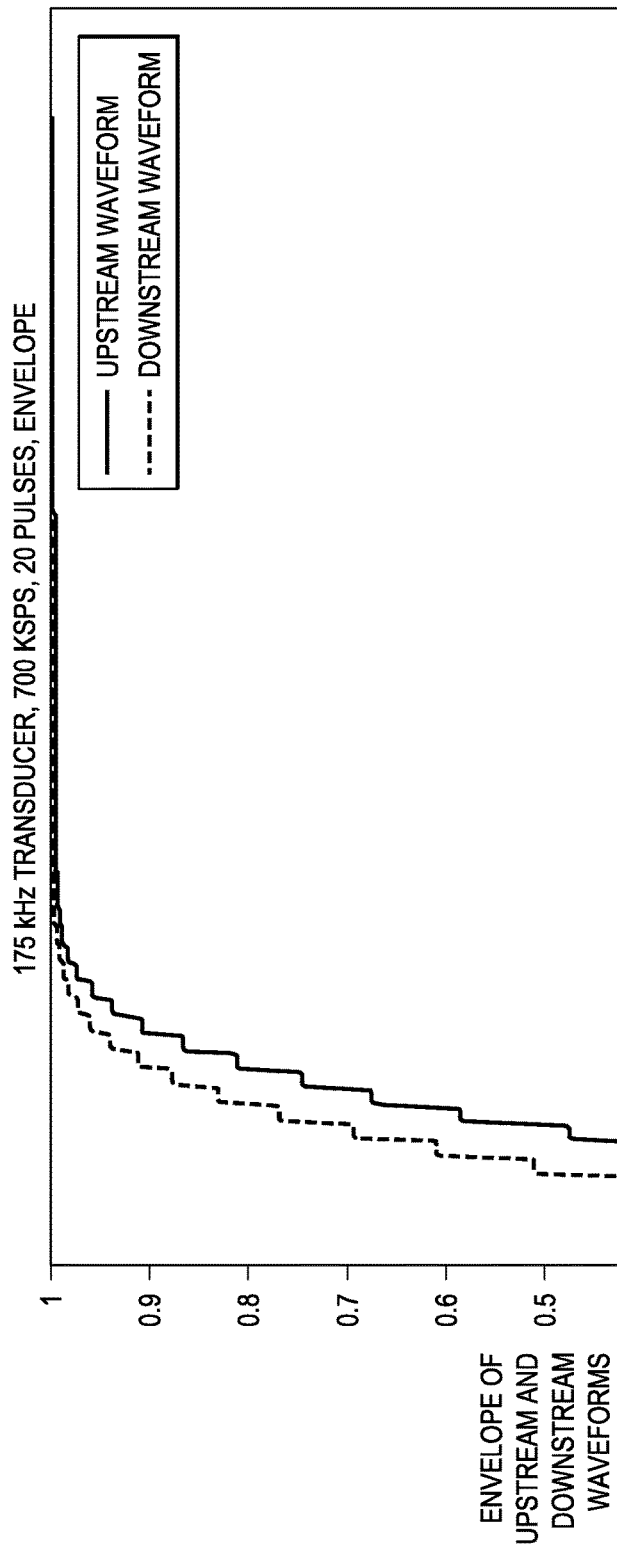
FIG. 8B is a diagram of signal envelopes of received upstream and downstream ultrasonic signals of FIG. 8A.

FIG. 8A is a diagram of received upstream and downstream ultrasonic signals generated by 20 excitation pulses. Here, an upstream waveform is a waveform that is received from a downstream source. Correspondingly, a downstream waveform is a waveform that is received from an upstream source. Thus, the upstream waveform is delayed with respect to the downstream waveform for any measurable fluid flow. The waveforms are normalized to values in a range of +/−1. Respective transmit times of the received ultrasonic signals are subtracted so that the offset is due to the differential time of flight ΔTOF. FIG. 8B illustrates the respective envelopes of the upstream and downstream waveforms with respective transmit times subtracted. The envelopes are generated from absolute values of samples and normalized to a range from 0 to 1 as explained with regard to FIG. 5D. The envelope value remains constant at each local maximum sample until increased by the next peak sample. The envelope waveform is preferably generated by MCU 210 (FIG. 2A).

Figure 9:
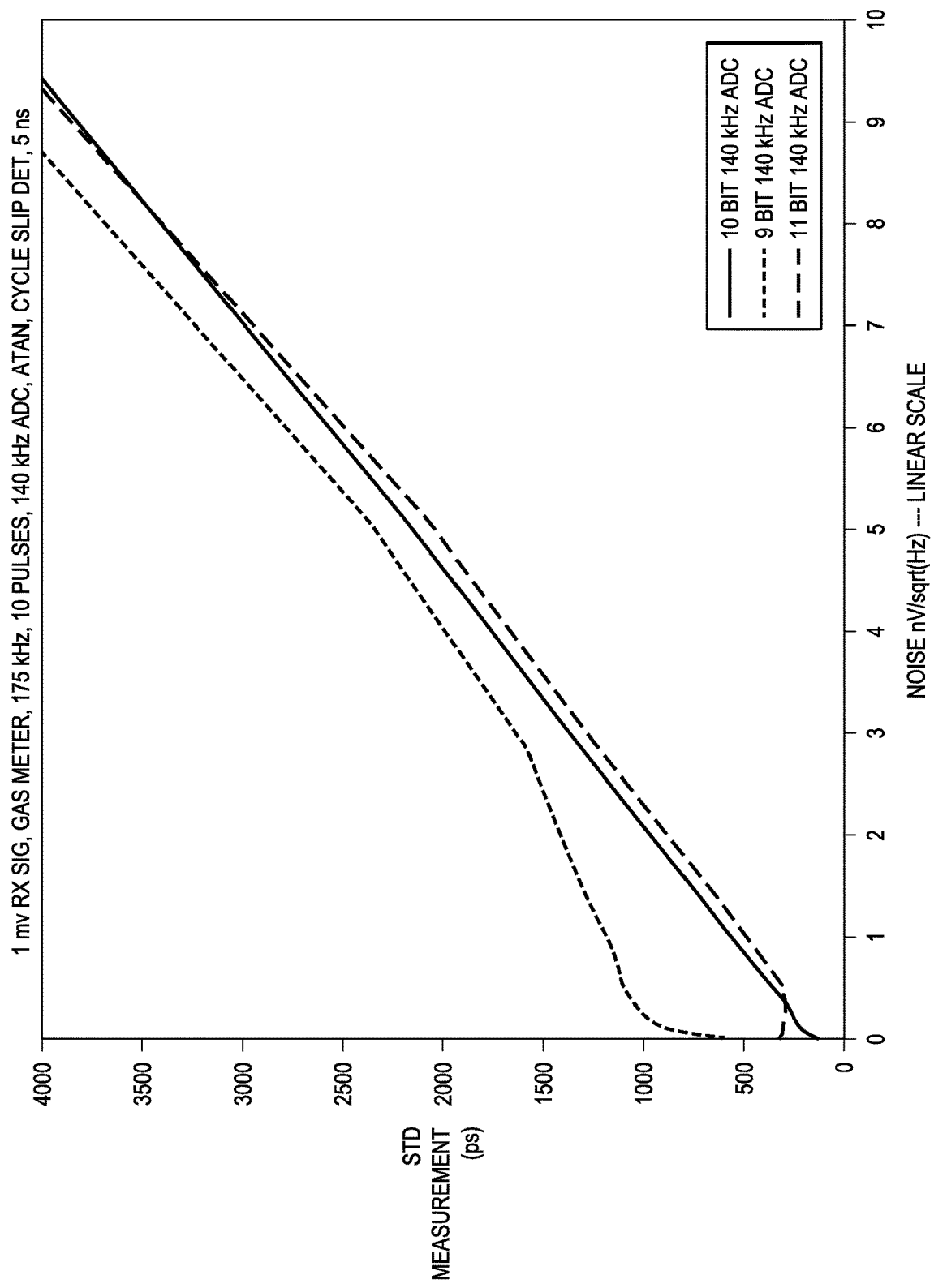
FIG. 9 is a simulation showing standard deviation of differential time of flight measurement as a function of system noise for 9, 10, and 11-bit Analog-to-Digital Converters (ADC)

Referring now to FIG. 9, there is a simulation showing standard deviation of fluid flow measurement in picoseconds as a function of system noise for 9, 10, and 11-bit resolution of ADC samples. The simulation shows the standard deviation is approximately linear and increasing with increasing system noise. Moreover, there is little difference between the three values of simulated ADC resolution.

Figure 10:
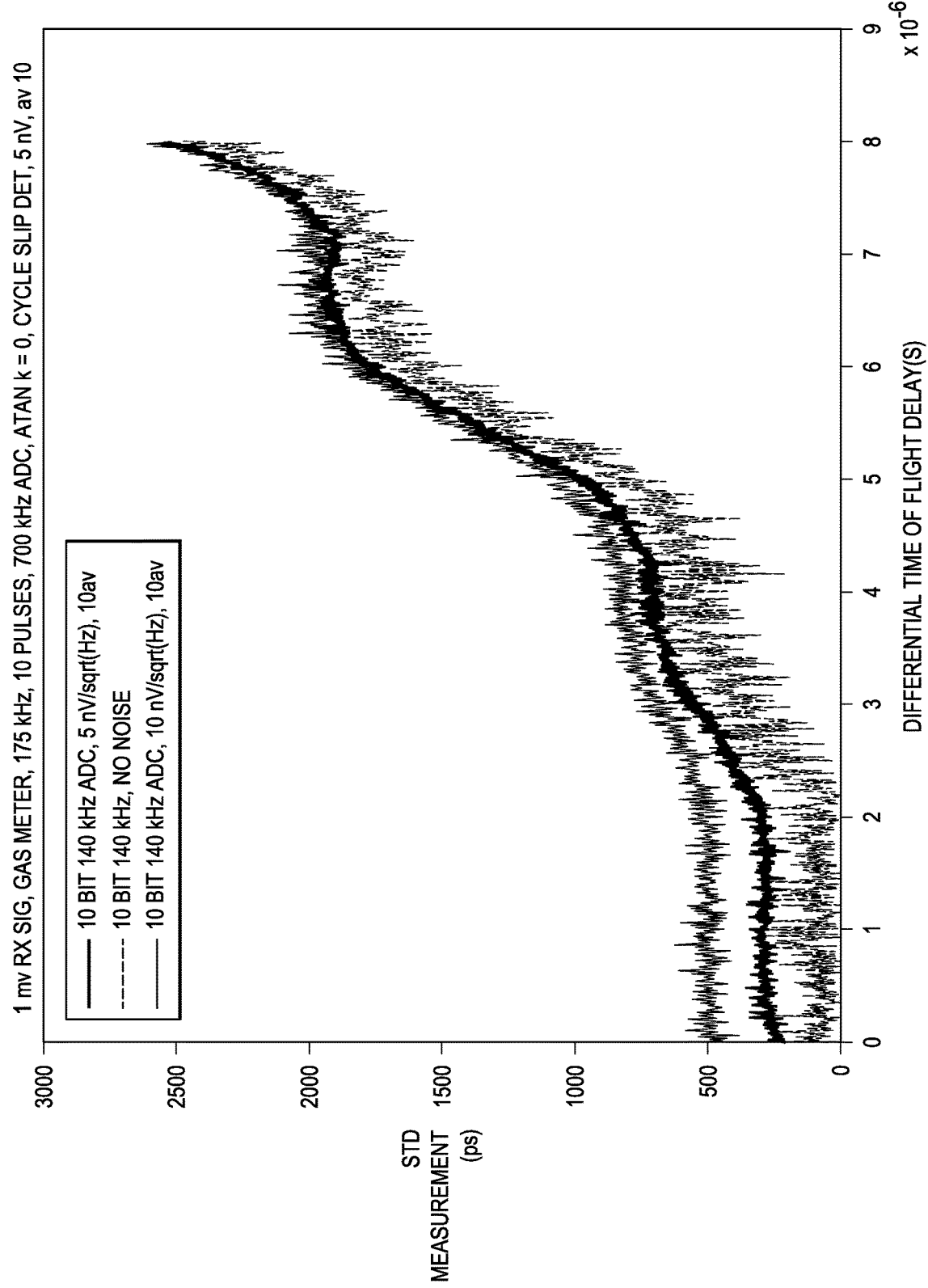
FIG. 10 is a simulation showing standard deviation of differential time of flight measurement as a function of differential time of flight delay for different system noise levels.

FIG. 10 is another simulation showing standard deviation of fluid flow measurement in picoseconds as a function of differential time of flight delay with system noise as a parameter. The simulation shows the greatest difference in standard deviation for small ΔTOF. Also, a significant increase in standard deviation occurs when the ΔTOF delay is near the 175 KHz excitation frequency cycle time. In general, the standard deviation increases with increasing ΔTOF for any simulated system noise level.

Still further, while numerous examples have thus been provided, one skilled in the art should recognize that various modifications, substitutions, or alterations may be made to the described embodiments while still falling within the inventive scope as defined by the following claims. For example, alignment points of received ultrasonic waveforms may be generated for positive half cycles, negative half cycles, of both. Likewise, linear zero crossing alignment points may be generated from received ultrasonic waveforms for positive slope, negative slope, or both. Moreover, peak and zero crossing alignment point calculation may only be necessary for relatively low sampling frequency or for greater accuracy. Otherwise, selected local sample values near half cycle peaks or zero crossings may be used as alignment points. Other combinations will be readily apparent to one of ordinary skill in the art having access to the instant specification.

What is claimed is:

1. A system for measuring a material flow in a pipe, the system comprising:
 a first transducer having a first analog output, the first transducer configured to: transmit first ultrasonic analog signals having a first frequency at first times; and receive second ultrasonic analog signals having the first frequency at second times different from the first times;
 a second transducer having a second analog output, the second transducer configured to: receive the first ultrasonic analog signals; and transmit the second ultrasonic analog signals;
 signal processing circuitry having an input coupled to the first and second analog outputs, the signal processing circuitry including an analog-to-digital converter (ADC) configured to: from the second analog output, receive the first ultrasonic analog signals at a second frequency different from the first frequency; provide first digital signals at the digital output responsive to the received first ultrasonic analog signals; from the first analog output, receive the second ultrasonic analog signals at the second frequency; and provide second digital signals at the digital output responsive to the received second ultrasonic analog signals; and
 the signal processing circuitry configured to:
  determine first alignment points of the second ultrasonic analog signals received from the first transducer and second alignment points of the first ultrasonic analog signals received from the second transducer, responsive to the first digital signals and the second digital signals, by finding a peak of the first ultrasonic analog signals and the second ultrasonic analog signals; and
  determine an average propagation time, responsive to the first alignment points and the second alignment points, by:
   determining a first propagation time of the first ultrasonic analog signals transmitted from the first transducer;
   determining a second propagation time of the second ultrasonic analog signals transmitted from the second transducer; and
   determining the average propagation time based on an average of the first propagation time and the second propagation time.

2. The system of claim 1, wherein the first transducer is affixed to a first portion of the pipe, and the second transducer is affixed to a second portion of the pipe.

3. The system of claim 1, wherein the signal processing circuitry is configured to measure the material flow responsive to the determined average propagation time.

4. The system of claim 1, wherein the signal processing circuitry is configured to determine the first alignment points and the second alignment points by: interpolating the first digital signals and the second digital signals.

5. The system of claim 4, wherein interpolating the first digital signals and the second digital signals includes: interpolating the first digital signals and the second digital signals by parabolic interpolation.

6. The system of claim 4, wherein interpolating the first digital signals and the second digital signals includes: interpolating the first digital signals and the second digital signals by linear interpolation.

7. The system of claim 1, wherein the second frequency is at least four times greater than the first frequency.

8. The system of claim 1, wherein the first transducer has a first analog input, the second transducer has a second analog input, and the system includes:
 multiplex circuitry having: a control input; a drive input; a first multiplex output coupled to the first analog input; and a second multiplex output coupled to the second analog input; and
 drive circuitry having a drive output coupled to the drive input, the drive circuitry configured to provide excitation signals at the drive output;
 the first transducer configured to: receive the excitation signals from the first multiplex output responsive to the control input having a first state; and transmit the first analog signals responsive to the received excitation signals; and
 the second transducer configured to: receive the excitation signals from the second multiplex output responsive to the control input having a second state; and transmit the second analog signals responsive to the received excitation signals.

9. The system of claim 1, including an analog filter having an input coupled to the first and second analog outputs, and an output coupled to an input of the ADC.

10. The system of claim 9, including programmable gain amplifier having an input coupled to the first and second analog outputs, and an output coupled to the input of the analog filter.

11. The system of claim 10, including multiplex circuitry having an input coupled to the first and second analog outputs, and an output coupled to the input of the programmable gain amplifier.

12. A system for measuring a material flow in a pipe, the system comprising:
 a first transducer having a first analog output, the first transducer configured to: transmit first analog ultrasonic signals having a first frequency at first times; and receive second analog ultrasonic signals having the first frequency at second times different from the first times;
 a second transducer having a second analog output, the second transducer configured to: receive the first analog signals; and transmit the second analog signals;
 signal processing circuitry having an input coupled to the first and second analog outputs, the signal processing circuitry including an analog-to-digital converter (ADC) configured to: receive the first analog ultrasonic signals from the second analog output at a second frequency greater than the first frequency; provide first digital signals at the digital output responsive to the received first analog ultrasonic signals; receive the second analog ultrasonic signals from the first analog output at the second frequency; and provide second digital signals at the digital output responsive to the received second analog ultrasonic signals, the signal processing circuitry configured to:
  determine first alignment points of the second analog ultrasonic signals and second alignment points of the first analog ultrasonic signals, responsive to the first digital signals and the second digital signals, by finding a peak of the first analog ultrasonic signals and the second analog ultrasonic signals;

determine an average propagation time, responsive to the first alignment points and the second alignment points, by:
  determining a first propagation time of the first analog ultrasonic signals transmitted from the first transducer;
  determining a second propagation time of the second analog ultrasonic signals transmitted from the second transducer; and
  determining the average propagation time based on an average of the first propagation time and the second propagation time; and
measure the material flow responsive to the determined average propagation time.

13. The system of claim 12, wherein the signal processing circuitry is configured to determine the first alignment points and the second alignment points by interpolating the first digital signals and the second digital signals.

14. The system of claim 13, wherein interpolating the first digital signals and the second digital signals includes: interpolating the first digital signals and the second digital signals by parabolic interpolation.

15. The system of claim 13, wherein interpolating the first digital signals and the second digital signals includes: interpolating the first digital signals and the second digital signals by linear interpolation.

16. The system of claim 12, wherein the second frequency is at least four times greater than the first frequency.

17. The system of claim 12, wherein the first transducer has a first analog input, the second transducer has a second analog input, and the system includes:

multiplex circuitry having: a control input; a drive input; a first multiplex output coupled to the first analog input; and a second multiplex output coupled to the second analog input; and drive circuitry having a drive output coupled to the drive input, the drive circuitry configured to provide excitation signals at the drive output;

the first transducer configured to: receive the excitation signals from the first multiplex output responsive to the control input having a first state; and transmit the first analog signals responsive to the received excitation signals; and the second transducer configured to: receive the excitation signals from the second multiplex output responsive to the control input having a second state; and transmit the second analog signals responsive to the received excitation signals.

18. The system of claim 12, including an analog filter having an input coupled to the first and second analog outputs, and an output coupled to the ADC circuitry.

19. The system of claim 18, including a programmable gain amplifier having an input coupled to the first and second analog outputs, and an output coupled to the input of the analog filter.

20. The system of claim 19, including multiplex circuitry having an input coupled to the first and second analog outputs and an output coupled to the input of the programmable gain amplifier.

* * * * *